United States Patent Office 2,859,118
Patented Nov. 4, 1958

2,859,118

METHOD OF COLD PROCESSING CITRUS FRUIT

George Thomas Lewis, Jacksonville, Fla., assignor of twenty-five percent to D. Byron King, Jacksonville, Fla.

No Drawing. Application March 9, 1953
Serial No. 341,332

3 Claims. (Cl. 99—101)

My invention relates to a citrus fruit product preferably of the approximate consistency of an ungelled spread, and to a method of cold processing of citrus fruit.

An object of my invention is to provide a palatable citrus fruit spread or flavoring product containing all of the vitamins and minerals existing in whole fresh citrus fruit.

Another object of my invention is to provide a method of treating whole citrus fruit at less than boiling temperatures to obtain a vitamin-rich product capable of being stored for extended periods at room temperature.

A specific object of my invention is to utilize whole citrus fruits, excluding only the seeds, in producing a flavorful and healthful citrus spread, flavoring, or the like.

The novel features which I believe to be characteristic of my invention are set forth with particularity in the appended claims. My invention itself, however, both as to its organization and method of operation, together with further objects and advantages thereof, may best be understood by reference to the following description.

My method of treatment of citrus fruits comprises a selection or preliminary treatment of the fruit, removal of seeds, and grinding and blending steps. To obtain the desired product, it is necessary to select fruits that are ripened to the point at which substantial quantities of pigments, such as xanthophyll and carotinoids, are present in the outer skin surface. Such pigments comprise an important source of vitamin A. On the other hand, the ripening should not be so far advanced as to substantially reduce the acid content of the fruit.

In accord with my invention, I prefer to select fruit which is fully developed and either partially green or ripe, or is synthetically ripened.

It will be understood that only sound fruit without blemishes is selected for use in my process, or that any existing blemishes are removed, and that the surface of the fruit should be cleaned in any desired suitable manner.

The fruit is next cored to remove the seeds and, if desired, the central portions of the fibrous membranes of the fruit. During extraction of the seeds and core, a certain amount of juice is recovered and the removed core is preferably pressed to extract the juice contained therein.

At this point the whole cored fruit is preferably cut in half and inspected. The juice is then extracted by boring or squeezing the fruit halves, and the juice is retained, preferably out of contact with air, for later use, together with the juice obtained during coring and from the removed cores.

The pulp and skin, remaining after the juice extracting step, is introduced into a grinder to be chopped into small particles, and the small particles are fed into a hammer mill for pulverization. During the grinding and milling of the pulp and skin, air should be excluded to prevent the escape of oils and alcohols from the flavedo oil sacs. It will be understood that many of the oil sacs will be ruptured during the grinding operation and that the oil sacs not ruptured in grinding will be ruptured in the hammer mill.

From the hammer mill is obtained a nearly dry mass of very small pulp and skin particles, and this mass is introduced into a variable speed blender or liquefier together with the juice previously obtained. The blender comprises a covered air tight tank or container in which is located an agitator, which may be of propeller shape, and which is arranged for high speed rotation. Upon introduction of the juice and milled particles into the tank, the agitator is rotated at a relatively low speed to initiate mixing of the juice and particles, and as mixing proceeds, the speed of the agitator is increased until a very high speed is obtained. Two important actions occur in the blender. The agitator first cuts any particles that are not already, from the grinding and milling, of very small size into such very small size. The agitator, secondly, and at the same time, intimately mixes the pulp and skin particles with the juice. In addition to the milled pulp and skin particles and juice which are placed in the blender, a quantity of sugar is added approximately equal in weight to the weight of juice or to the weight of milled particles. Rather than causing any thickening of the material in the blender, the addition of sugar in the suggested proportion causes the product to be somewhat less solid and seems to prevent the product from setting into a gel.

The product which is finally removed from the blender is a semi-liquid spread of about the consistency of apple butter or thick cream. In this spread will be all of the vitamins and minerals of the whole fruit including valuable and useful quantities of vitamin C and its synergist vitamin P; together with vitamin A, principally from the flavedo, and vitamin B, cellulose materials, and the original pectins and sugars.

It has been found that the product so prepared, when stored in air tight containers, will not spoil when stored at room temperatures for long periods of time, and may be kept in opened containers at room temperature for at least many days. Light is preferably excluded from the container to prevent pigment destruction and to permit storage over long periods.

Certain variations from the above steps may be found desirable under some conditions. For example, in adding juice and pulp and skin particles to the blender it is desirable that the amounts be proportioned to be equal in weight. Accordingly, if very juicy citrus fruits are involved, a portion of the juice should be omitted and used for some other purpose, or if the fruits are less than normally juicy, a portion of the milled pulp and rind should be omitted for separate use as cattle feed, fertilizer, or the like. If the fruit involved is orange, and if the oranges used are normally juicy and contain normal amounts of sugars, the proportions of juice and solid pulp and rind constituents will be found to be approximately equal, and in the blending step, an amount of refined white sugar equal in weight to the weight of the liquid or the solid constituents of the orange should be added. That is, approximately equal weights of sugar, of juice, and of milled pulp and rind should be blended together. If less than the usual amount of natural sugars are present in the oranges, the amount of sugar may be increased by up to about twenty percent. The total amount of natural and added sugar in the final product should be approximately 65 percent of the total weight.

At no time during the process should temperatures be permitted to increase beyond about 150° F. or 160° F., since higher temperatures may destroy vitamins and other valuable food portions. It has been found necessary with certain types of blender machines to provide a cooling water jacket about the container of the blender to maintain a sufficiently low temperature.

The final product produced by the blender may be used as a spread for bread, or the like, or it may be used in many other ways. Two tablespoons of the product added to about eight ounces of water or milk provides a delicious drink, and, when so added to milk, provides additional sources of vitamins and minerals without undesired side effects. It is to be noted that all of the original cellulose and pectin of the original fruit are present, and the pectin content and cellulose bulk are particularly valuable as milk additives, for the above reasons. The product may be used in the making of confections, and when mixed with peanut butter and dry milk powder, in the proportion of one-third each, a fruit-flavored "cream" of pasty consistency is obtained, which is particularly adapted as a filler for chocolate-covered bonbons. The product may be used to add the flavor of the citrus fruit from which it is made to many other products, such as ice cream, filling for pies, cakes, and the like. Admixture with cottage cheese provides desirable results in many possible uses of the product.

While I have shown and described only certain preferred embodiments of my invention by way of illustration, many modifications will occur to those skilled in the art, and I, therefore, wish to have it understood that I intend, in the appended claims, to cover all such modifications as fall within the true spirit and scope of my invention.

What I claim as new and desire to secure by Letters Patent of the United States is:

1. The method of treatment of citrus fruit to retain minerals and vitamins thereof which comprises removing the seeds from the fruit by coring, recovering juice from the cores and coring operation, squeezing the juice from the cored fruit and retaining said recovered and squeezed juice in the absence of air, grinding in the absence of air the fruit skin and pulp remaining from said squeezing operation, hammer milling in the absence of air the ground skin and pulp particles, adding a quantity of sugar substantially equal in weight to one-half of the combined weight of said milled skin and pulp particles and said retained juice and blending by means of high speed agitation in the absence of air all of the milled skin and pulp particles with all of said retained juice and with said added sugar, filling containers with the blended product resulting from said agitation, while maintaining said cored fruit, juice, skin, pulp and product at temperatures below about 150° F., and sealing said containers to exclude air from said product.

2. The method of treating oranges to provide a vitamin and mineral rich product which comprises removing the seeds from the oranges by coring, extracting the juice from said cored oranges, grinding the solid portions from which said juice has been extracted, hammer milling said ground solid portions, placing all of said juice and milled portions into a blender tank and adding thereto a quantity of white sugar substantially equal in weight to the weight of said juice, and blending said sugar, juice and milled portions by high speed agitation thoroughly to intermix said milled portions, sugar and juice while maintaining a temperature below about 160° F.

3. The method of treating citrus fruit to obtain a vitamin and mineral rich semi-liquid product which comprises removing the seeds from the fruit by coring, extracting the juice from the cored fruit, grinding the portions of the fruit from which the juice has been so extracted, milling said ground portions, adding all of said juice and milled portions to a quantity of white sugar substantially equal in weight to the weight of said juice, and thereafter blending said sugar, juice and milled portions by high speed agitation thoroughly to intermix and pulverize said milled portions, juice and sugar while maintaining a temperature below about 160° F.

References Cited in the file of this patent

UNITED STATES PATENTS

| 2,647,059 | Wenzelberger | July 28, 1953 |
| 2,650,881 | Forkner | Sept. 1, 1953 |
| 2,696,440 | Ball | Dec. 7, 1954 |

OTHER REFERENCES

"Commercial Fruit and Vegetable Products," by William V. Cruess, 3rd edition, publ. 1948, by McGraw-Hill Book Co., Inc., p. 677.